United States Patent
Sugiura et al.

(10) Patent No.: US 6,427,182 B1
(45) Date of Patent: Jul. 30, 2002

(54) DEVICE MANAGEMENT CONTROL IN RESPONSE TO AC CONNECTION/ DISCONNECTION

(75) Inventors: Yuji Sugiura; Toru Hanada, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/323,927

(22) Filed: Jun. 2, 1999

(30) Foreign Application Priority Data

Jun. 10, 1998 (JP) .......................................... 10-162151

(51) Int. Cl.[7] .............................................. G06F 13/00
(52) U.S. Cl. ........................ 710/303; 710/300; 710/304
(58) Field of Search ................................ 709/250, 253, 709/226, 227, 228; 710/303, 300, 304; 713/100, 200, 201, 202

(56) References Cited

U.S. PATENT DOCUMENTS

| | | | |
|---|---|---|---|
| 5,123,092 A | | 6/1992 | Buxton et al. |
| 5,596,728 A | * | 1/1997 | Belmont ...................... 710/304 |
| 5,598,539 A | | 1/1997 | Gephardt et al. |
| 5,721,835 A | * | 2/1998 | Niwa et al. .................. 710/303 |
| 5,859,970 A | * | 1/1999 | Pleso .......................... 709/250 |
| 5,991,839 A | * | 11/1999 | Ninomiya .................... 710/303 |
| 6,088,620 A | * | 7/2000 | Ninomiya et al. ........... 713/310 |

FOREIGN PATENT DOCUMENTS

| | | |
|---|---|---|
| JP | 5-35618 | 2/1993 |
| JP | 9-101846 | 4/1997 |
| JP | 10-91290 | 4/1998 |

* cited by examiner

*Primary Examiner*—Peter Wong
*Assistant Examiner*—Tim Vo
(74) *Attorney, Agent, or Firm*—Finnegan, Henderson, Farabow, Garrett & Dunner, L.L.P.

(57) ABSTRACT

When an AC adapter is connected to a LAN docker in a state "LAN docker connected, without AC adapter", the state of a PC main body transits to a state "LAN docker connected, with AC adapter". In this case, a system BIOS informs an OS of a change in docking state between the LAN docker and PC main body using "Dock_Changed". With this information, the OS detects the presence of the LAN docker, i.e., a LAN controller, and sets a state wherein the PC main body can use the LAN controller.

19 Claims, 6 Drawing Sheets

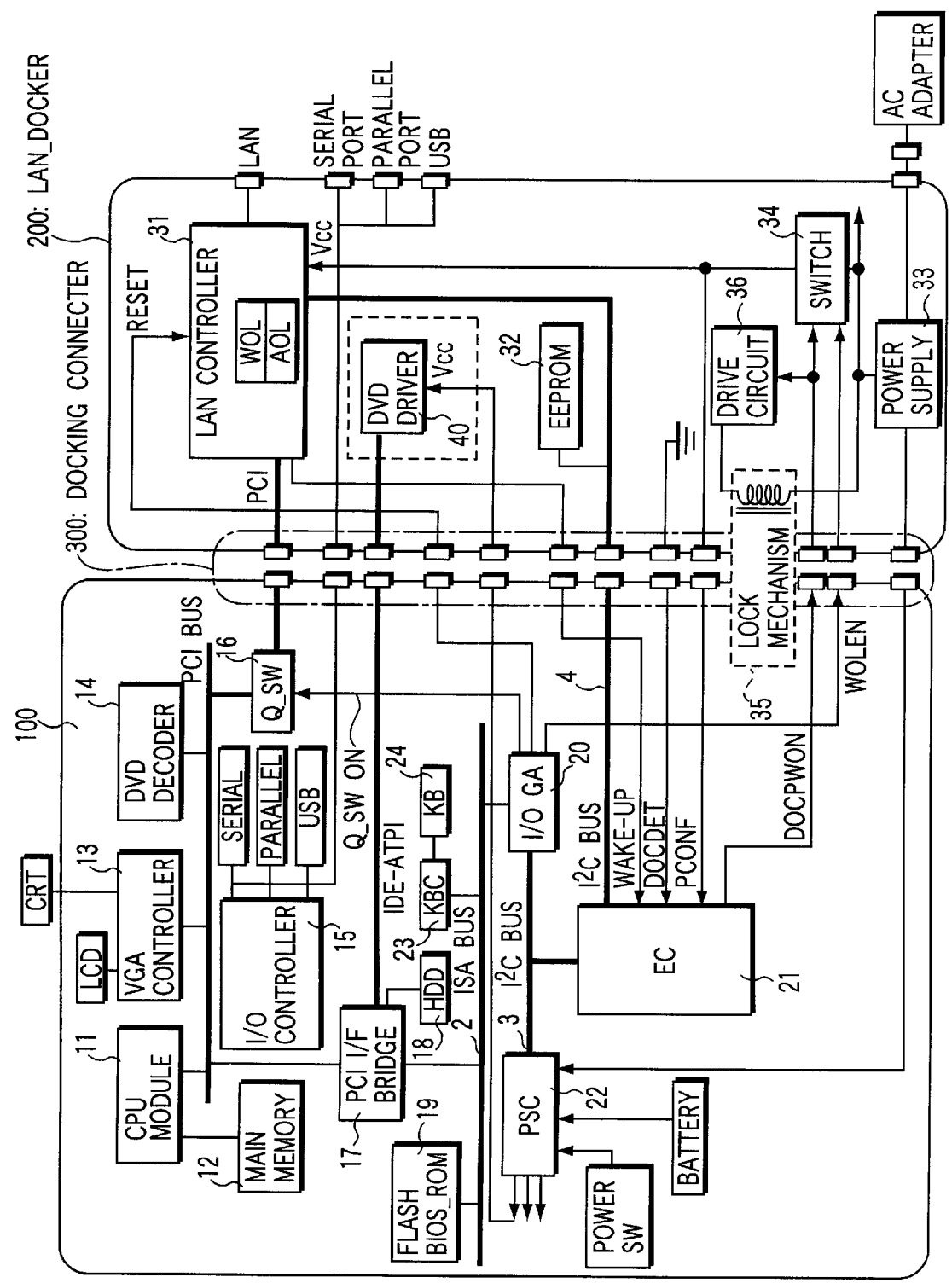
F I G. 1

DEVICE MANAGEMENT CONTROL IN RESPONSE TO AC CONNECTION/DISCONNECTION

BACKGROUND OF THE INVENTION

This application is based on Japanese Patent Application No. 10-162151, filed Jun. 10, 1998, the contents of which are incorporated herein by reference.

The present invention relates to a computer system and its state control method and, more particularly, to a computer system which is removably dockable to an expansion unit and its state control method.

In recent years, various kinds of notebook type personal computers (note PCs) that are easy to carry and can be battery-driven have been developed. Such note PC can be docked to an expansion unit called a docking station or docking base, as needed, so as to expand its functions.

When a note PC is connected to the expansion unit and is used, the functions of the note PC can be easily expanded without impairing its portability.

Recently, an operating system having a function of automatically re-configuring the hardware environment of the system (e.g., a plug-and-play function) has been developed. When such operating system is used, by informing the operating system of docking of the note PC to the expansion unit, the system environment can be automatically changed to that in which the expansion unit can be used.

Recently, IBM Japan has released desktop PCs having functions called "Wake_on_LAN (WOL)" for turning on desktop PCs under remote control from a server, and "Alert_on_LAN (AOL)" for automatically informing the server of abnormality of each desktop PC.

A typical remote management pattern using the WOL is as follows.

In an environment in which desktop PCs are set on the desks of individual employees as information tools in a company and are connected to a server via a LAN, when software programs installed in the respective desktop PCs are to be upgraded or when data are acquired from the respective desktop PCs, the IS department asks the employees to set their desktop PCs in a WOL enable state when they leave the company on a specific day. At midnight on that day, the server sends a special packet to the desktop PCs to automatically start up OFF or sleeping desktop PCs, thus upgrading the software program or acquiring data therefrom.

In case of a note PC, it is preferable that a LAN controller be accommodated not in the PC main body but in an expansion unit called a docking station or docking base, and that expansion unit be permanently connected to a LAN in an office. In this way, when the note PC is docked with the expansion unit in the office, it can be used as a desktop PC. On the other hand, when the user leaves the office, he or she can undock the note PC from the expansion unit and can carry it.

Furthermore, since the LAN controller consumes relatively large power, a power is supplied not from that note PC but from an AC adapter connected to the expansion unit to the LAN controller. That is, the use of the LAN controller must be permitted only when the AC adapter is connected. When the note PC suffers a low-battery state while the WOL function is enabled, remote control using WOL often cannot be normally executed.

However, when such arrangement that supplies a power only from the AC adapter connected to the expansion unit to the LAN controller is used, the LAN controller cannot operate unless the AC adapter is connected to that expansion unit. For this reason, a conventional docking informing function that informs the operating of docking of the note PC to the expansion unit at the time of docking can hardly correctly manage the state of the note PC.

More specifically, since the conventional function manages only two states, i.e., attachment (docking) and detachment (undocking) of the note PC to/from the expansion unit, even when a state change occurs owing to the presence/absence of the AC adapter, the OS cannot be informed of that state change. As a result, the use permission/inhibition control of the expansion unit cannot be done on the condition of the presence/absence of the AC adapter.

BRIEF SUMMARY OF THE INVENTION

It is an object of the present invention to provide a computer system which can correctly manage the docking condition with an expansion unit and the use condition of a device in the expansion unit in consideration of connection/disconnection of an external power supply such as an AC adapter or the like, and its state control method.

In order to achieve the above object, according to the present invention, a computer system removably dockable to an expansion unit, comprises: a detector for detecting whether an external power supply is connected to disconnected to the expansion unit; and a controller for setting the computer system to a state in which the use of the expansion unit is permitted, when an occurrence of a connection event of the external power supply is detected by the detector while the computer system main body is being docked to the expansion unit.

In this computer system, connection of the external power supply to the expansion unit is used as the docking condition that permits the computer system use of the expansion unit. When an occurrence of the connection event of the external power supply is detected in a state wherein the computer system main body is being docked to the expansion unit, it is detected that the docking condition is satisfied, and the computer system is permitted to use the expansion unit; when an occurrence of a disconnection event of the external power supply is detected in that state, it is detected that the docking condition is not satisfied, and the computer system is inhibited from using the expansion unit.

Since a state change, i.e., whether or not the expansion unit can be used, is monitored using three states that take the presence/absence of the external power supply into consideration in addition to two states, i.e., docking/undocking to/from the expansion unit, even when the AC adapter is connected to the expansion unit after the computer system main body is docked to the expansion unit, the docking process can be normally executed, and the computer system can use the expansion unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the arrangement of a PC and LAN docker according to an embodiment of the present invention;

DETAILED DESCRIPTION OF THE INVENTION

Figure 2:
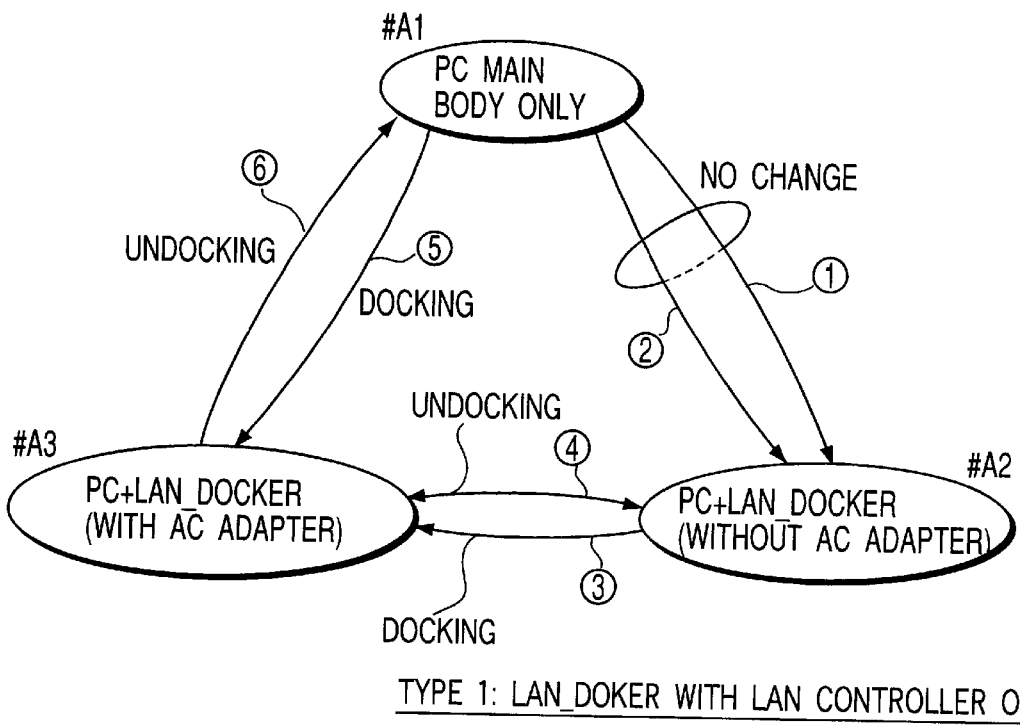
FIG. 2 shows state transitions in the PC main body when a LAN docker of type 1 (including a LAN controller alone) is used in the embodiment of the present invention.

The preferred embodiment of the present invention will be described hereinafter with reference to the accompanying drawings.

FIG. 1 shows the arrangement of a computer system according to an embodiment of the present invention. This computer system is a notebook type personal computer (to be abbreviated as a PC hereinafter) that can be battery-driven, and its PC main body 100 is free to be docked/undocked to/from a LAN docker (LAN_Docker) 200 which serves as an expansion unit for expanding functions. The PC main body 100 and LAN docker 200 are connected via docking connectors 300 provided to them.

The LAN docker 200 includes a LAN controller 31 which communicates with other PCs and a server via a LAN. The LAN controller 31 is compatible with the above-mentioned Wake_on_LAN (WOL) and Alert_on_LAN (AOL) functions. When the WOL function is enabled, the LAN controller 31 generates a wakeup signal Wake_up for automatically turning on the PC main body 100 upon receiving a specific packet from the server via the LAN. When the AOL function is enabled, the LAN controller 31 automatically informs the server of abnormality of the PC main body 100 and state change such as docking/undocking between the PC main body 100 and LAN docker 200 or the like via the LAN.

The LAN docker 200 with the built-in LAN controller 31 is placed on the desk of each employee in, e.g., an office, and is used while it is permanently connected to a LAN cable in the office. Since the LAN controller 31 consumes relatively large power, an external power from an AC adapter is used as its operation power supply.

The AC adapter can be connected to the PC main body 100 when the PC main body is used alone. However, when the PC main body 100 is docked to the LAN docker 200, since the external power supply terminal of the PC main body is covered by the LAN docker 200, the AC adapter can be connected to only the LAN docker 200.

The PC main body 100 is normally used as it is docked to the LAN docker 200 in the office, and is also used outside the office as it is undocked from the LAN docker 200. When the PC main body 100 is undocked from the LAN docker 200, it operates on its built-in batteries or an external power supplied via an AC adapter. On the other hand, when the PC main body 100 is connected to the LAN docker 200, it operates on its built-in batteries or an AC adapter power supplied from the LAN docker 200.

The PC main body 100 includes a PCI bus 1, ISA bus 2, two $I^2C$ buses 3 and 4, CPU module 11, main memory 12, VGA controller 13, DVD decoder 14, I/O controller 15, Q switch (Q-SW) 16, PCI interface bridge (PCI I/F) 17, HDD 18, flash BIOS-ROM 19, I/O control gate array (I/O GA) 20, embedded controller (EC) 21, power supply controller (PSC) 22, keyboard controller (KBC) 23, keyboard (KB) 24, and the like, as shown in FIG. 1.

The CPU module 11 executes operation control and data processing of the entire system, and includes a CPU, cache, memory controller for controlling the main memory 12, and the like.

The main memory 12 is used as a main storage of this system, and stores an operating system, an application program to be processed, user data created by the application program, and the like.

The VGA controller 13 controls an LCD or external CRT used as a display monitor of this system.

The I/O controller 15 is a gate array for controlling various I/O devices in the PC main body 100, and controls devices connected to various I/O connectors such as a serial port, parallel port, USB port, and the like provided to the rear surface of the PC main body 100. When the PC main body 100 is connected to the LAN docker 200, signals supplied from the I/O controller 15 to the I/O connectors on the rear surface of the PC main body 100 are passed to those on the rear surface of the LAN docker 200. In this case, the I/O connectors on the rear surface of the PC main body 100 cannot be used since they are covered by the LAN docker 200, but those on the rear surface of the LAN docker 200 can be used instead.

The Q switch (Q-SW) 16 is a switch circuit for connecting/disconnecting the internal PCI bus 1 to/from an external PCI bus of the LAN docker 200, and is ON/OFF-controlled in accordance with a switch control signal Q_SWON from the I/O control gate array (I/O GA) 20. When the Q switch (Q-SW) 16 is turned on, the LAN controller 31 can be used by the PC main body 100.

The PCI interface bridge (PCI I/F) 17 is a gate array implemented by a 1-chip LSI, and includes a bridge function of connecting the PCI bus 1 and ISA bus 2 in two ways, and an IDE controller for controlling the HDD 18. A control line from the IDE controller is also connected to the docking controller 300. When a DVD drive 40 indicated by the broken line in FIG. 1 is mounted on the LAN docker 200, the IDE controller can control that drive.

The flash BIOS-ROM 19 stores a system BIOS, and is comprised of a flash memory that is capable of a program rewrite. The system BIOS systemizes function execution routines for accessing various hardware components in this system, and includes a power management function of setting the system status in an operative state (power ON state), a stop state (power OFF state), or a sleep state (suspend/hibernation state) between these two states, a function of automatically recognizing a change in hardware environment of the system, a management function of the docking condition with the LAN docker 200, a function of controlling locking/unlocking of a lock mechanism 35 provided to the LAN docker 200, and the like.

The docking condition management function with the LAN docker 200 is to manage whether or not a docking condition that permits the PC main body 100 to use the LAN docker 200 is satisfied. Since the LAN controller 31 must receive an external power from the AC adapter, the PC main body 100 must be docked to the LAN docker 200, and an external power from the AC power must be supplied. Also, in order to allow use of the above-mentioned WOL/AOL function in only a specific combination of PC main body 100 and LAN docker 200, the docking condition includes such combination.

More specifically, in this embodiment, the docking condition is satisfied only when the PC main body 100 is docked to the LAN docker 200, and an external power is supplied from the AC adapter. When this condition is satisfied, ID collation is further made.

More specifically, when the WOL function of the LAN controller 31 is enabled, peculiar ID registration is done to register an ID (Dock_ID) peculiar to the LAN docker 200 in the flash BIOS-ROM 19. Upon generation of a wakeup signal Wake_up from the LAN controller 31, the Dock_ID registered in the flash BIOS-ROM 19 is collated with that of the LAN docker 200, and control as to whether or not the PC main body 100 is set in a working state is made based on the collation result.

Also, when the PC main body 100 is turned on while it is docked to the LAN docker 200, ID collation is made. When the two IDs do not coincide with each other, the PC main body 100 resumes its working state while it is inhibited from using the LAN controller 31; when the two IDs coincide with each other, or when the combination of the LAN docker 200 and PC main body 100 has not gone through ID registration with another apparatus, the PC main body is granted use of the LAN controller 31.

The I/O control gate array 20 is a bridge LSI that bridges the internal ISA bus 2 and I$^2$C bus 3, and incorporates a plurality of registers that can be read/written by the CPU module 11. Using these registers, the CPU module 11 can communicate with the power supply controller (PSC) 22 and embedded controller (EC) 21 on the I$^2$C buses 3 and 4.

The embedded controller (EC) 21 manages the power supply state of the PC main body 100 in cooperation with the power supply controller (PSC) 22. The embedded controller (EC) 21 and power supply controller (PSC) 22 are kept supplied with power even when the PC main body 100 is turned off and goes to a sleep or stop state. The embedded controller (EC) 21 has a function of controlling the power supply controller (PSC) 22 in response to detection of a generated power ON/OFF event, a function of informing the system BIOS of the generated power ON/OFF event as a power management event, and the like. The embedded controller (EC) 21 has, as functions of controlling the LAN docker 200, a function of detecting docking/undocking between the PC main body 100 and LAN docker 200, a function of controlling power supply to the LAN docker 200, a function of monitoring a wakeup signal from the LAN controller 31, a function of communicating with the LAN controller 31 via the I$^2$C bus 4, and the like. Upon detecting connection/disconnection of the AC adapter to/from the LAN docker 200, and docking/undocking of the PC main body 100 to/from the LAN docker 200, the EC 21 informs the system BIOS of that detection using an interrupt signal to the CPU.

Docking/undocking between the PC main body 100 and LAN docker 200 is detected using a dock detect signal DOCDET. The dock detect signal DOCDET indicates the voltage value of a predetermined pin of the docking connector 300, and goes low when the PC main body 100 is connected to the LAN docker 200.

Power supply control of the LAN docker 200 is done using a dock power ON signal DOCPWON and wake-on-LAN enable signal WOLEN.

The dock power ON signal DOCPWON is a power supply ON signal sent from the EC 21 in the PC main body 100 to the LAN docker 200 side. When the dock power ON signal DOCPWON is activated, the power supply of the LAN docker 200 is turned on.

The dock power ON signal DOCPWON is activated when:

1) docking of the PC main body 100 to the LAN docker 200 is detected based on the dock detect signal DOCDET; or
2) the power supply of the PC main body 100 is turned on in the docking state (including power ON upon operation of the power switch, and power ON in response to the wakeup signal Wake_up).

The dock power ON signal DOCPWON is inactivated when:

1) undocking of the PC main body 100 is detected based on the dock detect signal DOCDET;
2) the power supply of the PC main body 100 is turned off in the docking state; or
3) the system BIOS instructs to turn off the dock power ON signal DOCPWON.

Using this dock power ON signal DOCPWON, the LAN docker 200 can be ON/OFF-controlled in cooperation with docking/undocking and power ON/OFF of the PC main body 100.

The wake-on-LAN enable signal WOLEN determines whether or not the LAN docker 200 is maintained ON, when the dock power ON signal DOCPWON is inactivated upon power OFF of the PC main body 100 or undocking of the PC main body 100, and is sent from the I/O control gate array 20 in the PC main body 100 to the LAN docker 200 side.

When the WOL/AOL function of the LAN controller 31 is enabled, the system BIOS enables the wake-on-LAN enable signal WOLEN. Consequently, the LAN controller 31 is kept supplied with power, and even when the PC main body 100 is turned off and is set in a sleep or stop state, the LAN controller 31 can communicate with the server. After a switch circuit 34 provided to the LAN docker 200 holds an ON state in response to the signal WOLEN, it maintains the ON state even after the signal WOLEN is disabled. Hence, even when the PC main body 100 is turned off after the WOL function is enabled and is undocked from the LAN docker 200, power supply to the LAN controller 31 is maintained.

Of these two power supply control signals, the dock power ON signal DOCPWON is also used for controlling locking/unlocking the lock mechanism 35 provided to the LAN docker 200. This control turns on the LAN controller 31 while the lock mechanism 35 is enabled when the PC main body 100 wakes up to an operative state, and automatically unlocks the lock mechanism when the PC main body 100 shifts from the operative state to the stop or sleep state.

In this manner, since power supply to the LAN controller 31 is controlled using the two different power supply control signals, and locking/unlocking of the lock mechanism 35 is controlled by the dock power ON signal DOCPWON, power is supplied to the LAN controller 31 while keeping the lock mechanism locked when the PC main body 31 is operative, or power is supplied to the LAN controller 31 while keeping the lock mechanism unlocked when the PC main body 100 transits to the stop or sleep state upon power OFF. When the aforementioned docking condition is not satisfied and the use of the LAN controller 31 is inhibited, the dock power ON signal DOCPWON is inactivated by the system BIOS. In this way, works using the PC main body 100 can be made without locking the PC main body 100.

Note that a signal PCONF supplied from the LAN docker 200 side to the EC 21 is used for confirming whether or not the LAN controller 31 is ON. This signal PCONF is also used in detecting connection/disconnection of the AC adapter by the EC 21.

More specifically, when the dock power ON signal DOCPWON is active and the AC adapter is connected to the LAN docker 200, the signal PCONF goes high and power supply to the LAN controller 31 is started. On the other hand, when the AC adapter is disconnected from the LAN docker 200, the signal PCONF goes low and power supply to the LAN controller 31 is stopped. The EC 21 detects the leading/trailing edge of the PCONF as an occurrence of a connection/disconnection event of the AC adapter.

Of course, the power supply controller 22 may have a function of detecting the presence/absence of connection of the AC adapter, and upon occurrence of a connection/disconnection event of the AC adapter, the power supply controller 22 may inform the EC 21 of that event.

As the LAN docker 200, a first type docker which mounts the LAN controller 31 alone without any DVD drive 40, and a second type docker which mounts the DVD drive 40 in addition to the LAN controller 31 are available.

The DVD drive 40 is a DVD/CD compatible drive, and operates on a power supplied from the PC main body 100 docked to the LAN docker 200. Hence, in the LAN docker 200 of the second type that mounts the DVD drive 40, when the DVD drive 40 alone is used, the AC adapter need not be connected. Hence, even in an environment in which the AC adapter cannot be used, the DVD drive 40 can play back the contents of media, and a combination of PC main body 100 and LAN docker 200 can be carried.

Of course, when the AC adapter is connected to the LAN docker 200, since the battery of the PC main body 100 is automatically recharged by an external power supplied from the AC adapter, both the PC main body 100 and DVD drive 40 can operate on the external power supplied from the AC adapter.

Either type of LAN dockers 200 includes an EEPROM 32, a power supply circuit 33, a switch circuit 34, an electromagnetic lock mechanism 35, and a drive circuit 36 in addition to a LAN controller 31 as described above.

The EEPROM 32 stores PnP information required for implementing a plug-and-play function such as attribute information of the LAN docker 200, that of the LAN controller 31 built in the LAN docker 200, and the like. The attribute information of the LAN docker 200 includes an ID peculiar to that LAN docker 200. When the WOL/AOL function is enabled, the peculiar ID of the LAN docker 200 is read out from the EEPROM 32 by the system BIOS and is saved in the flash BIOS-ROM 19.

The power supply circuit 33 generates an internal power for the LAN docker 200 from an AC adapter power supply. A power for the LAN controller 31 is supplied from the power supply circuit 33 to the LAN controller 31 via the switch circuit 34. The switch circuit 34 is turned on when the signal DOCPWON is active, thus supplying power to the LAN controller 31. When the signal DOCPWON is inactive, the switch circuit 34 is turned off, thus cutting off power supply to the LAN controller 31. Note that the switch circuit 34 includes a state holding circuit, and holds the ON state until the next activation timing of the signal DOCPWON, if the signal WOLEN is active when the signal DOCPWON changes from active to inactive.

The lock mechanism 35 locks the PC main body 100 docked with the LAN docker 200 to prevent it from being ejected from the LAN docker 200. More specifically, the lock mechanism 35 locks the PC main body 100 while a solenoid is being energized by the drive circuit 36. That is, while the solenoid is energized, a button or lever for ejecting the PC main body 100 from the LAN docker 200 is inhibited from operating, and the PC main body 100 cannot be undocked from the LAN docker 200.

The solenoid is energized by the drive circuit 36 during the period in which the PC main body 100 can use the LAN controller 31, i.e., only the period in which the signal DOCPWON is maintained active. This is to prevent operation errors that may take place upon ejecting the PC main body 100 during the use of the LAN controller 31 and to easily eject the PC main body 100 while the LAN controller 31 is not used by the PC main body 100. While the signal DOCPWON is maintained active, an LED lamp is turned on. The ON LED lamp indicates an environment that allows the use of the LAN controller 31. On the other hand, the OFF LED lamp indicates an unlocked state, i.e., a state wherein the PC main body 100 can be safely undocked.

In this LAN docker 200, when the WOL function is enabled, the signal WOLEN is activated. As a result, even when the PC main body 100 enters a sleep state and the signal DOCPWON is inactivated, the LAN controller 31 is kept supplied with power. For example, when the user interrupts an ongoing work in the office and continues that work in another location after he or she brings the PC main body 100 there, such state is set. In this case, since the lock mechanism 35 is unlocked, the user can immediately undock the PC main body 100 from the LAN docker 200 and can carry it.

FIG. 2 shows state transitions in the PC main body 100 when the LAN docker 200 of type 1 (LAN controller alone) is used.

In this embodiment, the PC main body 100 has the following three states:

PC main body only (#A1)
LAN docker connected, without AC adapter (#A2)
LAN docker connected, with AC adapter (#A3)

"PC main body only" is the state wherein the PC main body 100 is not connected to the LAN docker 200. In this state (#A1), 1) when the PC main body 100 is docked to the LAN docker 200 to which no AC adapter is connected, the state transits to the state (#A2) "LAN docker connected, without AC adapter". In this state #A2, 2) when the PC main body 100 is undocked from the LAN docker 200, the state returns to #A1. Even when either transition 1) or 2) takes place, since the docking condition is not satisfied, no change in docking state between the LAN docker 200 and PC main body 100 is detected.

In state #A2, 3) when the AC adapter is connected to the LAN docker 200, the state transits to #A3 "LAN docker connected, with AC adapter" (Docking). In this case, the system BIOS turns on the Q switch 16 and informs the OS of a change in docking state between the LAN docker 200 and PC main body 100 using "Dock_Changed". With this information, the OS detects the presence of the LAN docker 200, i.e., the LAN controller 31, and sets a state wherein the PC main body 100 can use the LAN controller 31.

Conversely, in state #A3, 4) when the AC adapter is disconnected from the LAN docker 200, the state transits to

A2 "LAN docker connected, without AC adapter". In this case, the system BIOS turns off the Q switch 16, and informs the OS of the change in docking state between the LAN docker 200 and PC main body 100 using "Dock_Changed". With this information, the OS detects the absence of the LAN docker 200, i.e., the LAN controller 31, and excludes the LAN controller 31 from system devices that the PC main body can use (Undocking).

In state #A1 "PC main body only", 5) when the PC main body 100 is docked to the LAN docker 200 to which the AC adapter is connected, the state transits to the state (#A3) "LAN docker connected, with AC adapter". In this state, 6) when the PC main body 100 is ejected from the LAN docker 200, the state transits to #A1 "PC main body only".

Figure 3:
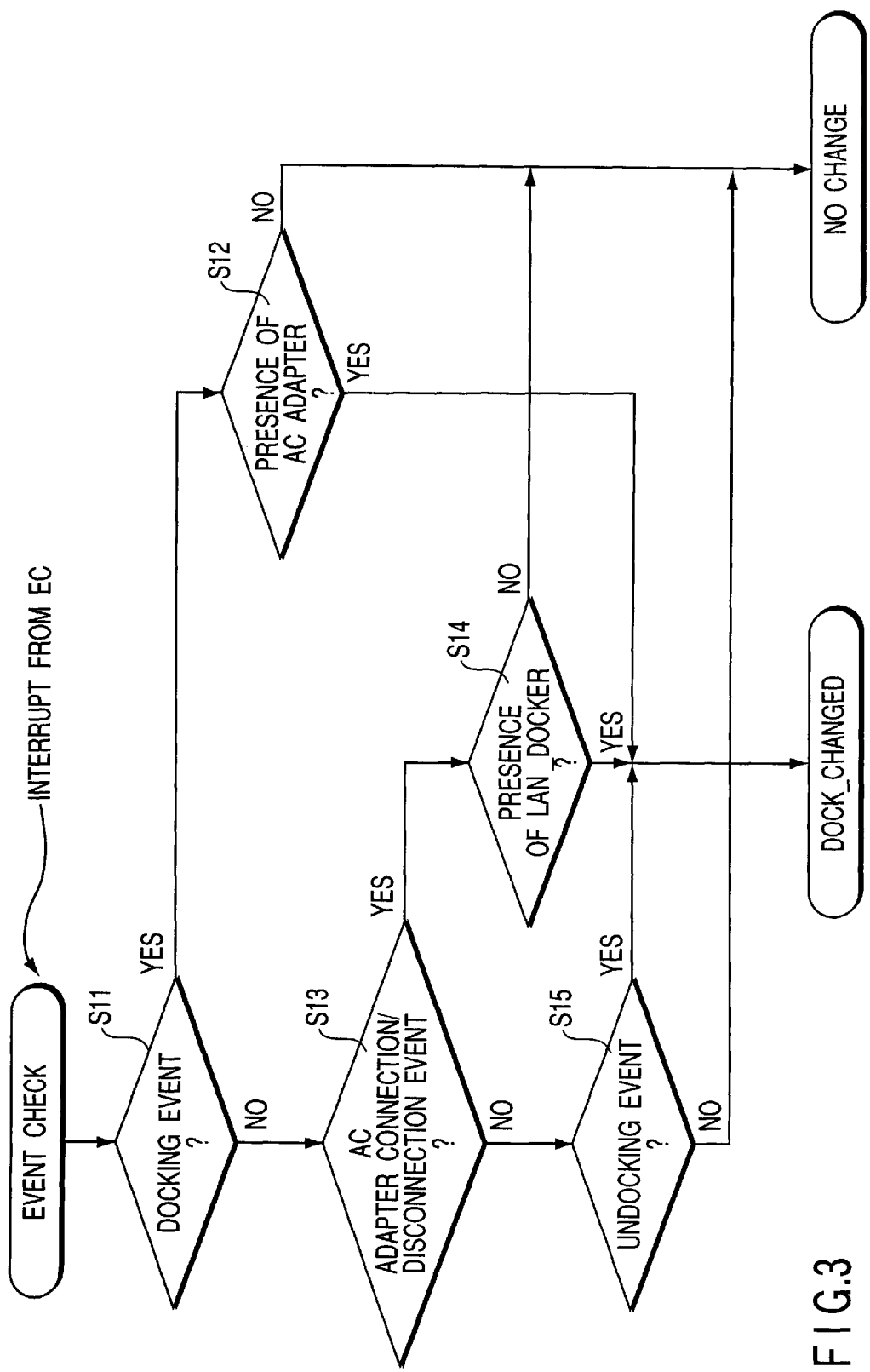
FIG. 3 is a flow chart showing the state management sequence executed by a system BIOS in the embodiment of the present invention.

FIG. 3 shows the state management sequence executed by the system BIOS.

The system BIOS executes the following processes every time an occurrence of event is informed by an interrupt from the EC 21.

More specifically, the system BIOS looks up registers in the EC 21 to check the event that caused an interrupt (steps S11, S13, and S15).

If a docking event indicating docking of the PC main body 100 to the LAN docker 200 has occurred (YES in step S11), the system BIOS checks with reference to the registers in the EC 21 if the AC adapter is connected (step S12). If the AC adapter is connected, the system BIOS executes a docking process such as a process for turning on the Q switch 16 and the like to inform the OS of "Dock_Changed".

If a connection/disconnection event of the AC adapter has occurred (YES in step S12), the system BIOS checks with reference to the registers in the EC 21 if the LAN docker 200 is connected (step S14). If the LAN docker 200 is connected, the system BIOS executes a docking process and informs the OS of "Dock_Changed".

If an undocking event indicating undocking of the PC main body 100 has occurred (YES in step S15), the system BIOS executes an undocking process such as a process for turning off the Q switch 16 and the like, and informs the OS of "Dock_Changed".

In this manner, in case of the LAN docker 200 of type 1 (LAN controller alone), the docking condition coincides with a condition that grants use of the LAN controller 31, and the OS is informed of the presence of the LAN controller 31 in synchronism with a docking message ("Dock_Changed").

Figure 4:
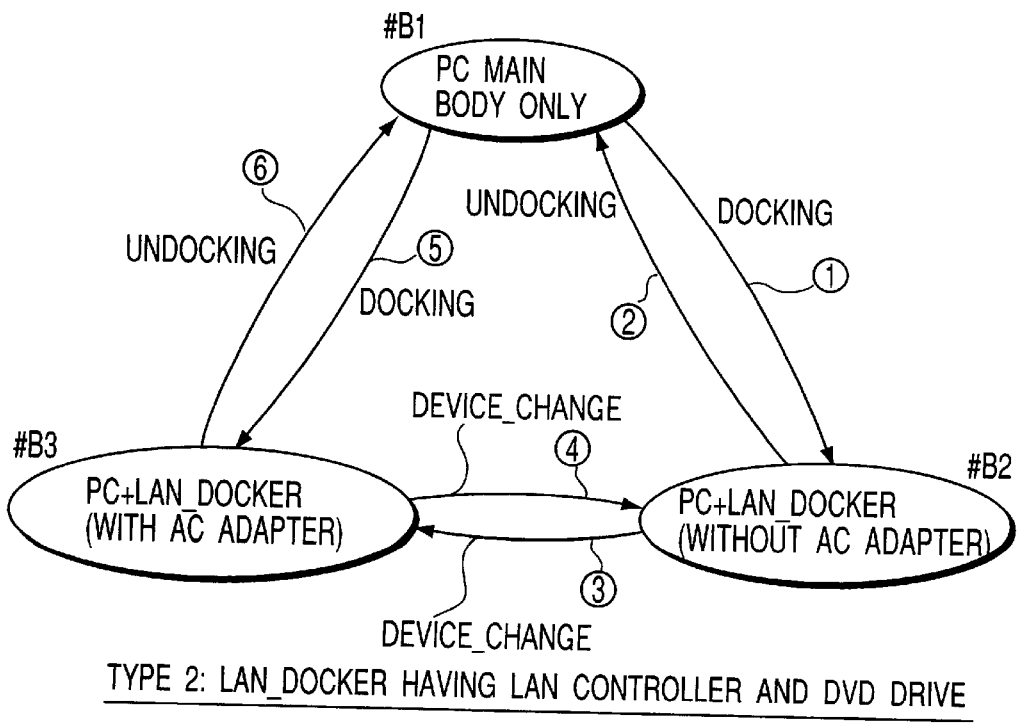
FIG. 4 shows state transitions in the PC main body when a LAN docker of type 2 (including a LAN controller and DVD drive) is used in the embodiment of the present invention.

FIG. 4 shows state transitions in the PC main body 100 when the LAN docker 200 of type 2 (LAN controller and DVD drive) is used.

In this embodiment, the PC main body 100 can have the following three states:

PC main body only (#B1)

LAN docker connected, without AC adapter (#B2)

LAN docker connected, with AC adapter (#B3)

"PC main body only" is the state wherein the PC main body 100 is not connected to the LAN docker 200. In this state (#B1), 1) when the PC main body 100 is docked to the LAN docker 200 to which no AC adapter is connected, the state transits to the state (#B2) "LAN docker connected, without AC adapter". In this case, the system BIOS informs the OS of a change in docking state between the LAN docker 200 and PC main body 100 using "Dock_Changed". With this information, the OS detects the presence of the LAN docker 200, i.e., the DVD drive 40, and sets a state wherein the PC main body 100 can use the DVD drive 40 (Docking).

In this state #B2, 2) when the PC main body 100 is undocked from the LAN docker 200, the state returns to #B1. In this case, the system BIOS informs the OS of a change in docking state between the LAN docker 200 and PC main body 100 using "Dock_Changed". With this information, the OS detects the absence of the LAN docker 200, i.e., the DVD drive 40, and excludes the DVD drive 40 from system devices that the PC main body can use (Undocking).

On the other hand, in state #B2, 3) when the AC adapter is connected to the LAN docker 200, the state transits #B3 "LAN docker connected, with AC adapter". In this case, since the use condition of the LAN controller 31 is satisfied, to grant use of the LAN controller 31 the system BIOS turns on the Q switch 16 and informs the OS of "Device_Changed" indicating that information, the OS detects the presence of the LAN controller 31, and sets a state wherein the PC main body 100 can use the LAN controller 31.

Conversely, in state #B3, 4) when the AC adapter is disconnected from the LAN docker 200, the state transits to #B2 "LAN docker connected, without AC adapter". In this case, since the use condition of the LAN controller 31 is not satisfied, the system BIOS turns off the Q switch 16, and informs the OS of "Device_Changed" indicating that the system device configuration has changed. With this information, the OS detects the absence of the LAN controller 31, and excludes the LAN controller 31 from system devices that the PC main body 100 can use.

In state #B1 "PC main body only", 5) when the PC main body 100 is docked to the LAN docker 200 to which the AC adapter is connected, the state transits to the state (#B3) "LAN docker connected, with AC adapter". In this case, the system BIOS turns on the Q switch 16, and informs the OS of a change in docking state between the LAN docker 200 and PC main body 100 using "Dock_Changed". With this information, the OS detects the presence of the LAN docker 200, i.e., the LAN controller 31 and DVD drive 40, and sets a state wherein the PC main body 100 can use the LAN controller 31 and DVD drive 40 (Docking).

In this state, 6) when the PC main body 100 is ejected from the LAN docker 200, the state transits to #B1 "PC main body only". In this case, the system BIOS turns off the Q switch 16, and informs the OS of a change in docking state between the LAN docker 200 and PC main body 100 using "Dock_Changed". With this information, the OS detects the absence of the LAN docker 200, i.e., the LAN controller 31 and DVD drive 40, and excludes the LAN controller 31 and DVD drive 40 from system devices that the PC main body 100 can use (Undocking).

Figure 5:
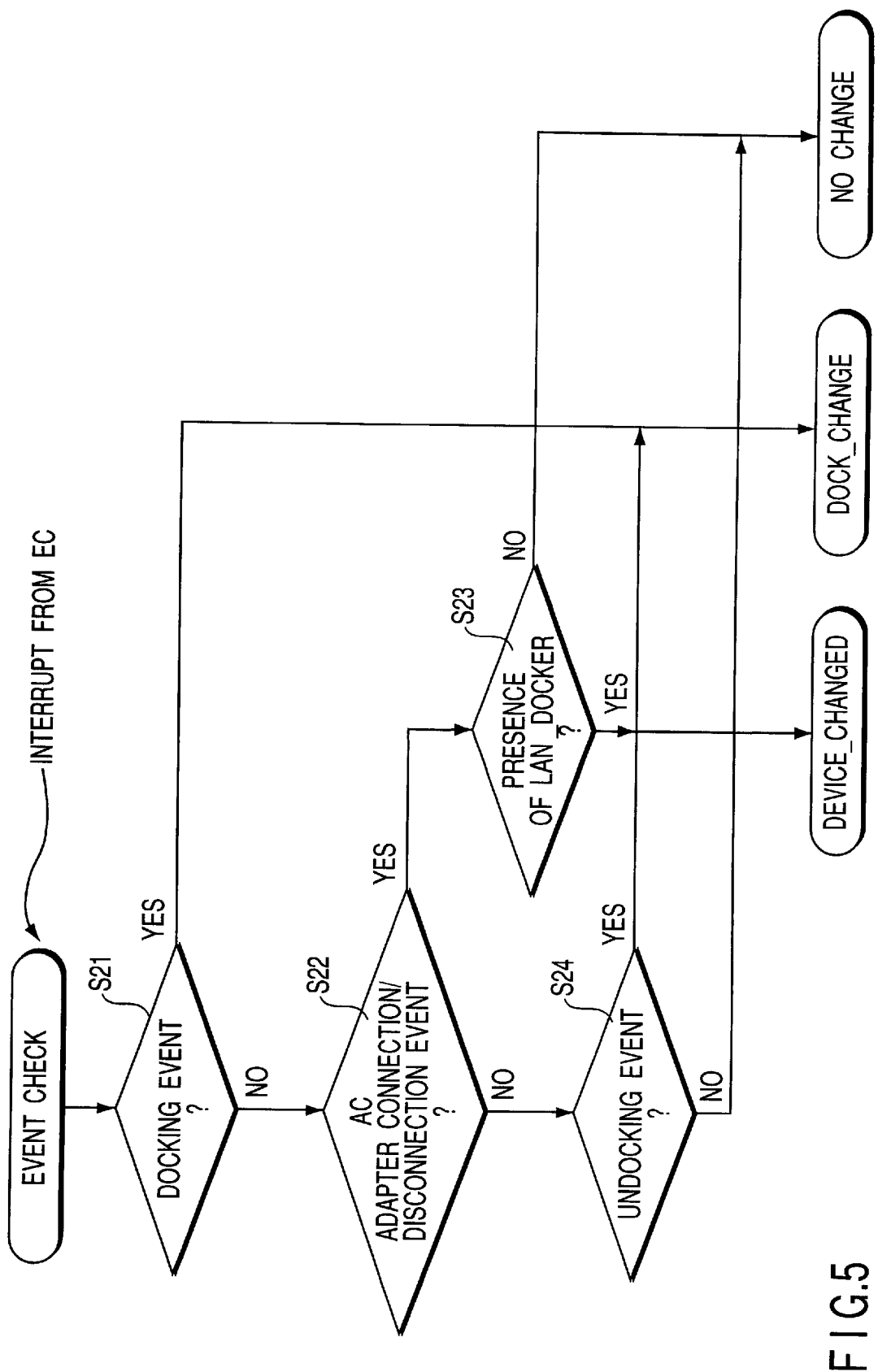
FIG. 5 is a flow chart showing the state management sequence executed by a system BIOS in the embodiment of the present invention.

FIG. 5 shows the state management sequence executed by the system BIOS.

The system BIOS executes the following processes every time an occurrence of event is informed by an interrupt from the EC 21.

More specifically, the system BIOS looks up registers in the EC 21 to check the event that led to an interrupt (steps S21, S22, and S24).

If a docking event indicating docking between the PC main body 100 and LAN docker 200 has occurred (YES in step S21), the system BIOS informs the OS of "Dock_Changed".

If a connection/disconnection event of the AC adapter has occurred (YES in step S22), the system BIOS checks with reference to the registers in the EC 21 if the LAN docker 200 is connected (step S23). If the LAN docker 200 is connected, the system BIOS informs the OS of "Device_Changed".

If an undocking event indicating undocking of the PC main body 100 has occurred (YES in step S24), the system BIOS informs the OS of "Dock_Changed".

As described above, in case of the LAN docker 200 of type 2 (LAN controller and DVD drive), since the condition that grants use of the LAN controller does not always match the docking condition, the PC main body is granted use of the LAN controller by informing the OS of "Device_Changed" upon connection of the AC adapter.

Figure 6:
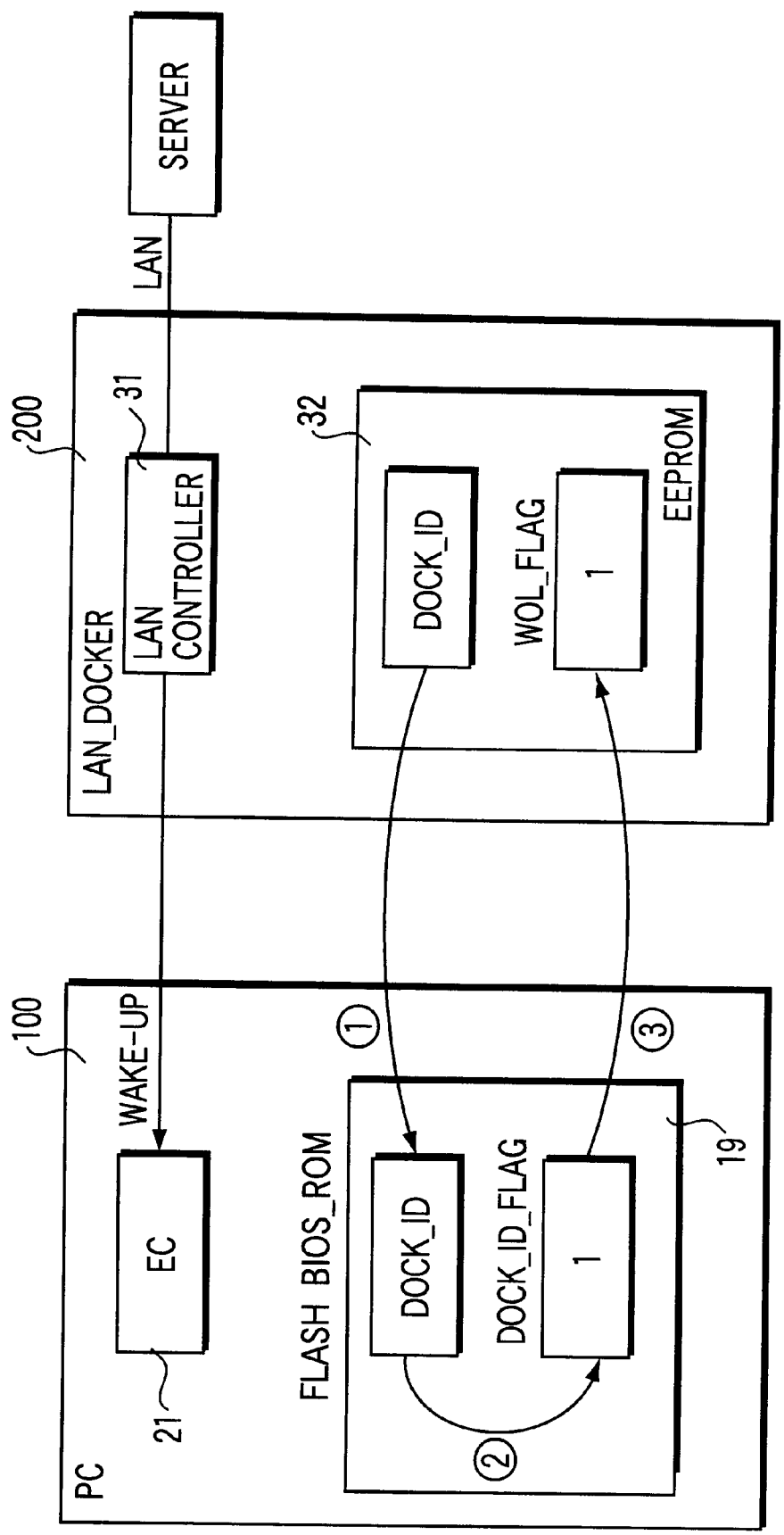
FIG. 6 is a view for explaining a docking management function using ID collation in the embodiment of the present invention.

The docking management function using ID collation will be explained below with reference to FIG. 6.

When the WOL function of the LAN controller 31 is enabled, the following ID registration is done by the system BIOS in that setup process.

1) The peculiar ID (Dock_ID) of the LAN docker 200 is read out from the EEPROM 32 of the LAN docker 200, and is registered in the data area of the flash BIOS-ROM 19 of the PC main body 100 as the peculiar ID of the docking partner. 2) A dock ID flag (Dock_ID_FLAG) prepared in the data area of the flash BIOS-ROM 19 is set at "1". The dock ID flag (Dock_ID_FLAG) indicates whether or not the peculiar ID of the docking partner has been registered, and Dock_ID_FLAG=1 indicates that the peculiar ID of the docking partner has been registered, in other words, the PC main body 100 is paired with the LAN docker 200 to implement the WOL function, and the WOL function of the PC main body 100 is enabled.

After that, 3) a wake-on-LAN flag (WOL_FLAG) held in the EEPROM 32 of the LAN docker 200 is set at "1". The wake-on-LAN flag (WOL_FLAG) indicates whether or not the ID (Dock_ID) peculiar to the LAN docker 200 has been registered in the PC main body as the docking partner, and WOL_FLAG="1" indicates that Dock_ID has been registered in the PC main body as the docking partner, or the PC main body 100 is paired with the LAN docker 200 to implement the WOL function, and the WOL function of the LAN docker 200 is enabled.

When the WOL function is enabled, the afore-mentioned wake-on-LAN enable signal WOLEN is enabled. In this manner, after the power supply of the PC main body 100 is turned off, the LAN controller 31 is kept powered.

Upon receiving a specific packet from the server, the LAN controller 31 issues a wakeup signal Wake_up to the PC main body 100. The EC 21 of the PC main body 100 is kept ON. Upon receiving the wakeup signal Wake_up, the EC 21 informs the power supply controller (PSC) 22 of that signal to make the controller 22 turn on the power supply of the PC main body 100 and begin to supply a minimum power required for starting up the system BIOS. At the same time, the EC 21 generates a dock power ON signal DOCPWON.

The system BIOS reads out the ID (Dock_ID) peculiar to the LAN docker 200 from its EEPROM 32 to check if the current combination of PC main body 100 and LAN docker 200 has gone through ID registration, and compares the readout Dock_ID with Dock_ID registered in the flash BIOS-ROM 19. If the two IDs do not coincide with each other, the system BIOS turns off the power supply of the PC main body 100, and resets its system status to a state (suspend/hibernation/stop state) before generation of the wakeup signal Wake_up. On the other hand, if the two IDs coincide with each other, the system BIOS turns on the Q switch 16, executes a resume process from the suspend/hibernation state or starts up the OS, and passes control to the OS. In this fashion, the PC main body 100 can be accessed from the server via the network using the LAN controller 31.

ID collation is also done when the power switch of the PC main body 100 is turned on while it is docked to the LAN docker 200. If their IDs do not coincide with each other, the PC main body 100 returns to a working state while inhibiting the LAN controller 31 from being used; if the two IDs coincide with each other, or if neither Dock_ID_FLAG nor WOL_FLAG are registered and the current combination of LAN docker 200 and PC main body has not gone through ID registration with another device, the PC main body 100 is granted use of the LAN controller 31.

As described above, in this embodiment, since collation is done using peculiar IDs, remote control using the WOL function is allowed in only a specific combination of LAN docker 200 and PC main body 100.

Hence, even when the PC main body 100 is undocked from the LAN docker 200 after the WOL function is enabled, a one-to-one relationship between the LAN docker 200 and PC main body 100 can be held, and even when another PC is docked to the LAN docker 200, data in that PC can be prevented from being erroneously updated.

While the PC main body 100 is undocked from the LAN docker 100, data or the like from the server are held in the LAN controller 31, and when the PC main body 100 registered with an authentic ID is re-docked to the LAN docker 200, the held data are passed onto the PC main body 100.

As described above, in this embodiment, the LAN docker 200 with the WOL/AOL enabled is peculiar to the paired PC, and even when another PC is docked to that LAN docker 200, a process is done in the PC while ignoring the presence of the LAN docker 200. Similarly, even when a PC with the WOL/AOL enabled is docked to a LAN docker with the WOL/AOL disabled, that PC cannot use the LAN docker (i.e., an undocking state).

Figure 7:
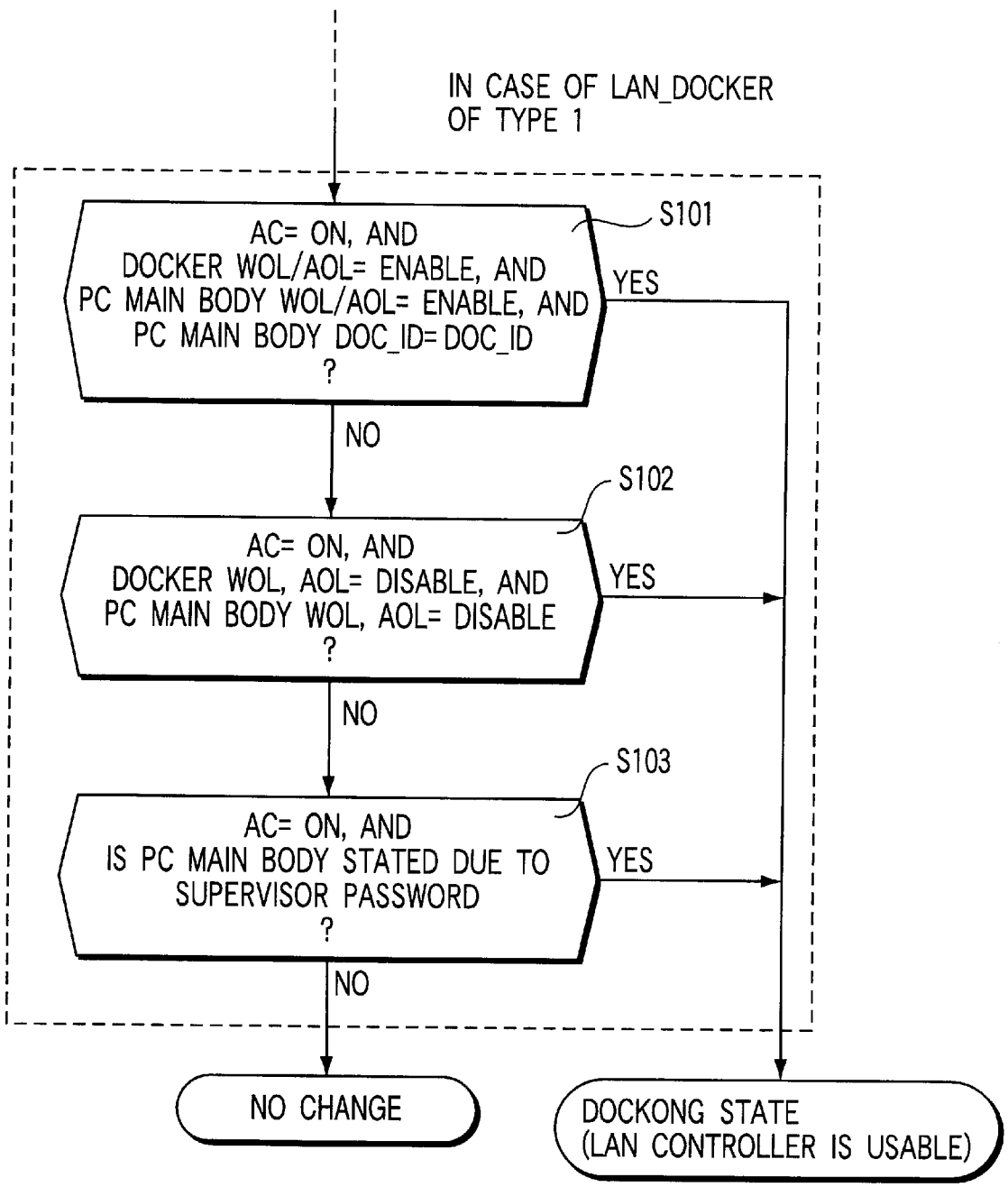
FIG. 7 is a flow chart showing the determination sequence of a docking condition (=LAN controller use condition) executed when ID collation is applied to a LAN docker 200 of type 1 in the embodiment of the present invention.

FIG. 7 shows the discrimination sequence of the docking condition (=LAN controller use condition) executed by the system BIOS when such ID collation is applied to the LAN docker 200 of type 1.

As mentioned above, in case of the LAN docker 200 of type 1, the docking condition matches the LAN controller use condition, and when one of the following three conditions is satisfied, use of the LAN controller 31 is permitted.

(Condition 1)

the AC adapter is connected to the LAN docker 200, the AOL/WOL functions of both the LAN docker 200 and PC main body 100 are enabled, and a peculiar ID registered in the PC main body 100 coincides with that of the LAN docker 200.

If these conditions are satisfied (step S101), it is determined that the docking condition is satisfied, and the PC main body 100 can use the LAN docker 200, i.e., the LAN controller 31.

(Condition 2)

the AC adapter is connected to the LAN docker 200, and the AOL/WOL functions of both the LAN docker 200 and PC main body 100 are disabled.

When such conditions are satisfied (step S102), it is determined that the docking condition is satisfied, and the PC main body 100 can use the LAN docker 200, i.e., the LAN controller 31.

(Condition 3)

the AC adapter is connected to the LAN docker 200, and the PC main body 100 is started by inputting a supervisor password.

When such conditions are satisfied (step S103), it is determined that the docking condition is satisfied, and the PC main body 100 can use the LAN docker 200, i.e., the LAN controller 31.

In this manner, when the PC is started using a supervisor password that verifies a system supervisor, use of the LAN controller 31 is granted irrespective of the presence/absence of a coincidence between IDs. In this manner, when a computer system, which is paired with a given expansion unit, cannot be identified, or when that computer system is broken, lost, or stolen, the AOL/WOL function can be disabled by invalidating the registered IDs using the PC that has been started using the supervisor password, and the LAN docker 200 can be used from another PC as usual.

In case of the LAN docker 200 of type 2 (LAN controller and DVD drive), a condition that determines docking to execute a docking process does not match the LAN controller use condition. The condition that determines docking is the one excluding a condition of AC adapter connection from the condition for type 1, and the LAN controller use condition is the same as that for type 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising a computer and an expansion unit removably connectable to the computer, the expansion unit comprising:
    a first device operated under control of the computer;
    a second device operated under control of the computer; and
    a connector connectable to an external power supply,
    wherein the computer comprises:
        determining means for determining whether the connector is connected to the external power supply when the expansion unit is connected to the computer;
        an internal power supply; and
        power controller means for supplying power from the external power supply to the first device and the second device when it is determined that the connector is connected to the external power supply and for supplying power from the internal power supply only to the second device when it is determined that the connector is not connected to the external power supply.

2. The computer system according to claim 1, further comprising:
    informing means for informing an operating system of a first change of a docking state between the computer and the expansion unit based on whether the connector is connected to the external power supply.

3. The computer system according to claim 1, further comprising:
    means for informing an operating system of a change of a docking state between the computer and the expansion unit in order to set the computer system to a state in which the first device can be used based on whether the connector is connected to the external power supply.

4. The computer system according to claim 1, wherein
    the first device comprises a power supply switch;
    the second device comprises a signal transfer line switch; and
    the power controller means makes the power supply switch and the signal transfer line switch conductive when it is determined that the connector is connected to the external power supply and makes the power supply switch and the signal transfer line switch nonconductive when it is determined that the connector is not connected to the external power supply.

5. The computer system according to claim 2, wherein
    the determining means further determines whether the connector is disconnected from the external power supply; and
    the informing means informs the operating system of a second change of the docking state between the computer and the expansion unit based on whether the determining means determines that the connector is disconnected from the external power supply.

6. The computer system according to claim 2, wherein
    the determining means further determines whether the connector is disconnected from the external power supply;
    the informing means informs the operating system of a second change of the docking state between the computer and the expansion unit in order to set the computer system to a state in which the first device cannot be used when the determining means determines that the connector is disconnected from the external power supply.

7. A computer removably connectable to an expansion unit, the expansion unit comprising:
    a first device operated under control of the computer;
    a second device operated under control of the computer; and
    a connector connectable to an external power supply,
    wherein the computer comprises:
        determining means for determining whether the connector is connected to the external power supply when the expansion unit is connected to the computer;
        an internal power supply; and
        power controller means for supplying power from the external power supply to the first device and the second device when it is determined that the connector is connected to the external power supply and for supplying power from the internal power supply only to the second device when it is determined that the connector is not connected to the external power supply.

8. The computer according to claim 7, further comprising:
    informing means for informing an operating system of a first change of a docking state between the computer and the expansion unit based on whether the connector is connected to the external power supply.

9. The computer according to claim 7, further comprising:
    means for informing an operating system of a change of a docking state between the computer and the expansion unit in order to set the computer to a state in which the first device can be used based on whether the connector is connected to the external power supply.

10. The computer according to claim 7, wherein
    the first device comprises a power supply switch
    the second device comprises a signal transfer line switch; and
    the power controller means makes the power supply switch and the signal transfer line switch conductive when it is determined that the connector is connected to the external power supply and makes the power supply switch and the signal transfer line switch nonconductive when it is determined that the connector is not connected to the external power supply.

11. The computer according to claim 8, wherein the determining means further determines whether the connector is disconnected from the external power supply; and the informing means informs the operating system of a second change of the docking state between the computer and the expansion unit based on whether the determining means determines that the connector is disconnected form the external power supply.

12. The computer according to claim 8, wherein the determining means further determines that the connector is disconnected form the external power supply;

the informing means informs the operating system of a second change of the docking state between the computer and the expansion unit in order to set the computer to a state in which the first device cannot be used when the determining means determines that the connector is disconnected from the external power supply.

13. A method for controlling a computer removably connectable to an expansion unit, the expansion unit comprising:

a first device operated under control of the computer;

a second device operated under control of the computer; and a connector connectable to an external power supply; and the method comprising:

determining whether the connector is connected to the external power supply when the expansion unit is connected to the computer; and supplying power from the external power supply to the first device and the second device when it is determined that the connector is connected to the external power supply; and supplying power from the internal power supply only to the second device when it is determined that the connector is not connected to the external power supply.

14. The method according to claim 13, further comprising:

informing an operating system of a first change of a docking state between the computer and the expansion unit based on whether the connector is connected to the external power supply.

15. The method according to claim 13, further comprising:

informing an operating system of a change of a docking state between the computer and the expansion unit in order to set the computer to a state in which the first device can be used based on whether the connector is connected to the external power supply.

16. The method according to claim 13, wherein the first device comprises a power supply switch;

the second device comprises a signal transfer line switch; and further comprising the step of:

making the power supply switch and the signal transfer line switch are made conductive when it is determined that the connector is connected to the external power supply and nonconductive when it is determined that the connector is not connected to the external power supply.

17. The method according to claim 14, wherein the determining step further comprises determining whether the connector is disconnected from the external power supply; and the informing step further comprises informing the operating system of a second change of the docking state between the computer and the expansion unit based on whether the connector is disconnected from the external power supply.

18. The method according to claim 14, wherein the determining step further comprised determining that the connector is disconnected from the external power supply; and the informing step further comprises informing the operating system of the second change of a docking state between the computer and the expansion unit in order to set the computer to a state in which the first device cannot be used when it is determined that the connector is disconnected from the external power supply.

19. A computer removably connectable to an expansion unit, said expansion unit comprising:

a first device operated under control of the computer;

a second device operated under control of the computer; and a connector connectable to an external power supply; wherein the computer comprises:

a unit configured to determine whether the connector is connected to the external power supply when the expansion unit is connected to the computer;

an internal power supply; and a power controller configured to supply power from the external power supply to the first device and the second device when it is determined that the connector is connected to the external power supply and configured to supply power from the internal power supply only to the second device when it is determined that the connector is not connected to the external power supply.

* * * * *

UNITED STATES PATENT AND TRADEMARK OFFICE
CERTIFICATE OF CORRECTION

PATENT NO.   : 6,427,182 B1
DATED        : July 30, 2002
INVENTOR(S)  : Sugiura et al.

It is certified that error appears in the above-identified patent and that said Letters Patent is hereby corrected as shown below:

Column 15,
Lines 10 and 13, change "disconnected form" to -- disconnected from --.

Signed and Sealed this

Eighth Day of April, 2003

JAMES E. ROGAN
*Director of the United States Patent and Trademark Office*